(12) United States Patent
Wilbourn et al.

(10) Patent No.: US 8,707,429 B2
(45) Date of Patent: Apr. 22, 2014

(54) DNS RESOLUTION, POLICIES, AND VIEWS FOR LARGE VOLUME SYSTEMS

(75) Inventors: Robert S. Wilbourn, Palo Alto, CA (US); Jonathan P. Wood, Paddington (AU); Robert Thomas Halley, Aberdeen (GB)

(73) Assignee: Nominum, Inc., Redwood City, CA (US)

( * ) Notice: Subject to any disclaimer, the term of this patent is extended or adjusted under 35 U.S.C. 154(b) by 149 days.

(21) Appl. No.: 13/077,934

(22) Filed: Mar. 31, 2011

(65) Prior Publication Data
US 2012/0254996 A1    Oct. 4, 2012

(51) Int. Cl.
*G06F 21/00*    (2013.01)
(52) U.S. Cl.
USPC ............................................. 726/22; 709/223
(58) Field of Classification Search
USPC .................................... 726/1, 22–26; 709/223
See application file for complete search history.

(56) References Cited

U.S. PATENT DOCUMENTS

| | | | |
|---|---|---|---|
| 6,961,783 B1* | 11/2005 | Cook et al. ..................... | 709/245 |
| 2005/0111384 A1* | 5/2005 | Ishihara et al. ............... | 370/254 |
| 2007/0118669 A1* | 5/2007 | Rand et al. ..................... | 709/245 |
| 2010/0030914 A1* | 2/2010 | Sparks et al. .................. | 709/235 |
| 2010/0131646 A1* | 5/2010 | Drako ............................ | 709/225 |
| 2012/0036241 A1* | 2/2012 | Jennings et al. .............. | 709/222 |

* cited by examiner

*Primary Examiner* — Matthew Smithers
(74) *Attorney, Agent, or Firm* — Carr & Ferrell LLP

(57) ABSTRACT

Systems and methods for resolving domain name system (DNS) queries are provided herein. Methods may include receiving a DNS query from a DNS client via a DNS server, responsive to the DNS query, generating the DNS response utilizing the at least one policy associated with the view, providing the DNS response to the DNS client from which the DNS query was received, and storing the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

50 Claims, 5 Drawing Sheets

DNS RESOLUTION, POLICIES, AND VIEWS FOR LARGE VOLUME SYSTEMS

FIELD OF THE INVENTION

The present invention relates generally to (DNS) server systems, and more specifically, but not by way of limitation, to DNS server systems that utilize policies, and views for large volume systems.

BACKGROUND

According to exemplary embodiments, the present technology is directed to systems and methods that utilize DNS systems that are adapted to utilize policy frameworks and a plurality of views. It will be understood that the term "view" may be understood to be a representation of a DNS namespace that a DNS client can access. That is, the DNS view defines the set of DNS names that are available to a particular DNS client and one or more methodologies for interpreting those DNS names. Simply stated, the view provides a context for interpretation of a domain name.

Generally speaking, the systems and methods provided herein may be adapted to decouple the DNS resolver and an associated DNS cache from the rest of a view. It will be understood that the terms "DNS resolver" may include a DNS server, a DNS name server, a domain name system server, and any other structural and/or functional equivalents.

Additionally, the systems and methods of the present technology may be adapted to utilize shared DNS caches. According to some embodiments, a shared cache may include previously generated DNS responses from preceding DNS queries. Rather than generating new DNS responses for each DNS query received, previously generated DNS responses may be provided to DNS clients in response to subsequent DNS queries. As such, the utilization of a shared cache provides a framework for creating a DNS system that allows for a unique view for each DNS client. That is, DNS responses may be shared across a plurality of views, allowing for a proliferation of views, unlike commonly utilized DNS server systems.

Common DNS resolvers may employ both an internal view and an external view, and each view has its own cache. That is, each DNS client receives the same "view" of the DNS response as every other DNS client. By decoupling the view from the cache, the DNS servers may share DNS responses amongst a limitless number of views, such that each DNS client may have their own unique "view" of the DNS response (whether the DNS response was previously generated or uniquely generated). More specifically, each view may include specific policies that may modify previously generated DNS responses taken from the shared cache to personalize the previously generated DNS responses provided to the DNS client.

The DNS resolver may then function as a configurable object that may be shared amongst a plurality of views. Generally speaking, the DNS resolver may be adapted to generate a DNS response filtered or modified according to the policies and configuration provided by the view where the view is selected for a DNS client in a novel manner.

It will be understood that each of the plurality of views may be at least one of bound to a private DNS resolver and a shared DNS resolver. Views that are adapted to utilize a shared DNS resolver may be collectively referred to as a "lightweight view." These lightweight views cause the application of one or more policies such as malicious domain redirection and/or non-existent domain redirection policies, although one of ordinary skill in the art will appreciate that the systems and methods provided herein may be adapted to provide other suitable policies. Lightweight views may scale to service a plurality of views that may include hundreds of thousands, if not millions of separate views that may each be customized by association with one or more policies.

SUMMARY OF THE INVENTION

Various embodiments of the present invention are methods for resolving domain name system (DNS) queries. According to some embodiments, methods for resolving DNS queries may include: (a) receiving a DNS query from a DNS client via a DNS server, the DNS query being assigned to a view via one of several means of identifying the source of the DNS query to be utilized by the DNS server to generate a DNS response, the view being associated with one or more policies, the view being bound to at least one policy; (b) responsive to the DNS query, generating the DNS response utilizing the at least one policy associated with the view; (c) providing the DNS response to the DNS client from which the DNS query was received; and (d) storing the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

According to other embodiments, the present technology may be directed to a domain name system (DNS) server system adapted to resolve DNS queries, the system comprising: (a) at least one DNS server adapted to receive a DNS query from a DNS client via, the DNS query being assigned to a view, the view being associated with one or more policies, the view including at least one policy, the at least one DNS sever adapted to: (i) generate a DNS response utilizing the view by applying the at least one policy to the DNS query, the at least one DNS resolver being communicatively coupled to the at least one DNS name server; (ii) provide the DNS response to the DNS client from which the DNS query was received; and (iii) store the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

In additional embodiments, the present technology may be directed to non-transitory computer readable storage mediums that include a computer program embodied thereon. In some embodiments, the computer program may be executable by a processor in a computing system to perform a method for resolving domain name system (DNS) queries. Methods may include the steps of: (a) receiving a DNS query from a DNS client via a DNS server, the DNS query being assigned to a view to be utilized by the DNS server to generate a DNS response, the view being associated with one or more policies, the view including at least one policy; (b) responsive to the DNS query, generating the DNS response utilizing the at least one policy associated with the view; (c) providing the DNS response to the DNS client from which the DNS query was received; and (d) storing the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

DETAILED DESCRIPTION OF EXEMPLARY EMBODIMENTS

Figure 1:
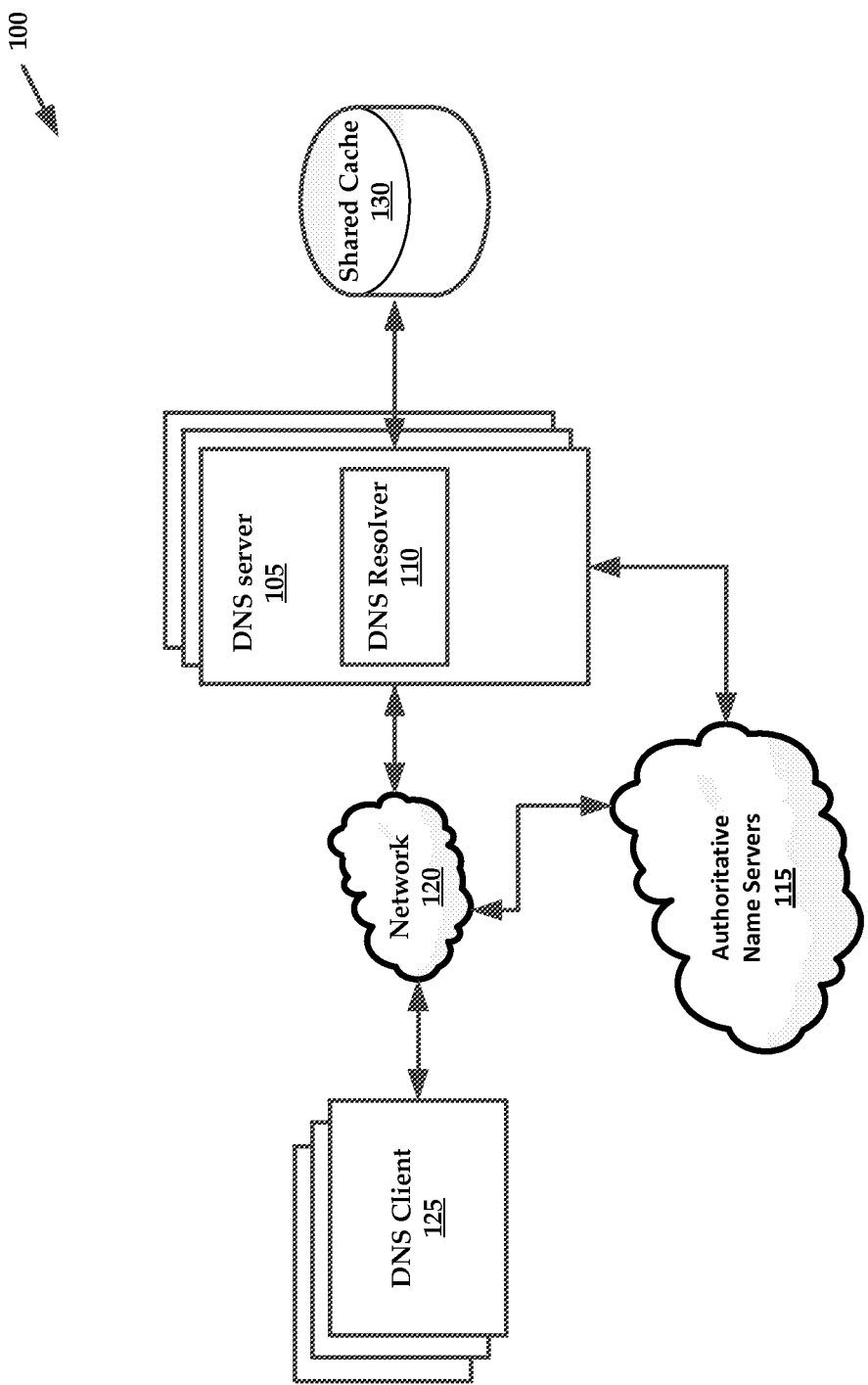
FIG. 1 is an exemplary DNS server system that may be utilized to resolve domain name system (DNS) queries.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

According to exemplary embodiments, the present invention is directed to systems and methods that utilize DNS resolvers that, in turn, utilize policies and views for processing DNS queries in large volume (i.e., large numbers of DNS queries) systems.

Amongst other functionalities, the systems and methods provided herein may be adapted to decouple the DNS resolver and its associated DNS cache from the view so that the DNS cache can be used by multiple views. It will be understood that the term "DNS server" may include, a DNS name server, a domain name system server, and any other structural and/or functional equivalents. Additionally, the DNS server includes one or more DNS resolvers that are adapted to resolve IP addresses that correspond to DNS queries that include domain names.

Because the systems and methods provided herein may decouple the DNS resolver and its associated DNS cache from the view, the systems and methods may utilize a shared cache that is shared amongst numerous views. More specifically, rather than resolving a DNS query anew for a DNS query that is processed by different views, each view may use the same DNS resolver to construct and return a DNS answer for DNS queries received at different views. This means that the shared cache of DNS responses used by this resolver is accessible to all of the different views. For example, assuming that a previously generated DNS response for a particular domain name exists, subsequent DNS queries for the same domain name, received from a plurality of DNS clients will result in the utilization of the previously generated DNS response.

To tailor the previously generated DNS response for the particular view of each DNS client, one or more post-resolution policy hooks may be applied to the shared DNS response to modify the shared DNS response.

As such, previously generated DNS responses may be shared across a plurality of views associated with individual DNS client devices. This ability to shared DNS responses across a plurality of views allows the systems and methods of the present technology to facilitate numerous DNS views. Moreover, the view associated with a particular DNS client affects the ultimate DNS response that is provided to the DNS client.

FIG. 1 illustrates an exemplary DNS server system 100 that may be utilized to practice aspects of the present disclosure. While the system 100 may include a plurality of DNS name servers, DNS resolvers, authoritative name servers, and so forth, for the purposes of brevity and clarity, the system 100 is shown to include a DNS name server 105 having a DNS resolver 110, and a plurality of authoritative name servers 115. The components of system 100 are shown as being communicatively coupled to one another via a network 120. It will be understood that portions of the network 120 may include a private network such as a wireless telecommunication network, wide area network, or local area network, or a combination of networks, although portions of the network 120 may also include one or more public networks such as the Internet. It will further be understood that although the DNS resolver 110 has been disclosed as being a component of the DNS server 105, the respective functionalities of the DNS resolver 110 may be incorporated into another DNS server that is located remotely from the DNS server 105.

Generally speaking, the components of system 100 may include all or portions of an exemplary computing system such as computing system 400 described in greater detail with reference to FIG. 4.

The DNS server 105 may be particularly adapted to receive DNS queries from DNS client 125. It will be understood that the DNS client 125 may include an end user computing system, or any other web server such as a DNS server.

The DNS query may include a request to resolve a domain name. The DNS server 105 may evaluate the DNS query to determine the view that is to be assigned the DNS query. As stated above, the "view" may be defined as a DNS construct that defines a context for the interpretation of a domain name (e.g., DNS name space). Additionally, the term "view," as described herein with regard to policies may also be referred to as a lightweight view.

It will be understood that a view may define the context for interpretation of a domain name by way of one or more bindings that are associated with the view. According to some embodiments, a binding for a view may, in turn, include one or more policies associated with a description of a set of DNS queries. One embodiment of this set is a list of DNS names or regular expressions that describe a set of names or IP addresses associated with the DNS query. Other list expressions are possible. It will be understood that each policy is comprised of a selector expression and an action. That is, for each action, a policy may also include a corresponding selector.

A selector determines whether a policy is applicable to a DNS name or DNS attribute of DNS query. The selector affects the actual DNS response that is to be generated for a DNS query, based upon the particular action associated with the policy. For example, a policy may include a selector that examines the query type of the DNS query to determine if the query type is query type "A." In one example, a query type of "MX" that corresponds to email may be specified. As such, the selector may determine that if a policy applies to a DNS query of type "MX." If the DNS query is not of type "MX," the particular action is not applied to the DNS query.

In an additional example, if the selector is of type "A," and the selector determines that the DNS query type is "A," the action associated with the selector is applied to the DNS query. For example, the action may be to return a specific IP address for all queries of type "A." This type of action may be referred to as "redirecting" a DNS query.

In an additional example, an action may include the DNS server 105 logging DNS queries and DNS responses generated from the DNS queries via the DNS resolver 110. The selector for the policy may specify that all DNS queries and DNS responses be logged.

Additional exemplary actions may include any of logging, blocking, filtering, modifying, editing, constraining, enabling, redirecting, promoting, demoting, substituting, obscuring, limiting, interrupting, restricting, or combinations thereof.

In other embodiments, actions may be described as either terminal or non-terminal actions. For example, an action such as "log" may be considered a non-terminal action because the action of logging may take place until the DNS server 105 is instructed to stop gather data about the DNS queries and DNS responses. A terminal action is an action that causes a terminal event. For example, an action such as "block IP address" may be considered a terminal action because no further actions may be taken with regard to the DNS query or DNS response (depending on whether the action is associated with a pre-resolution policy hook or a post-resolution policy hook).

Because each view may have a plurality of policies associated therewith, the DNS server 105 may be adapted to apply the plurality of policies to a DNS query according to a prioritization of policies. For example, the DNS server 105 may apply several policies to a DNS query in a sequential manner, based upon policy ranking received from a systems administrator or another end user.

Rather than including only policies, a view may be bound to one or more lists that are, in turn, each bound one or more policies. According to some embodiments, the one or more lists may each include one or more nodes such as domain names, Internet protocol IP addresses, or subdomains, sub-domain directories, virtual subdomains, wildcard domains, and so forth.

By way of non-limiting example, a DNS query may correspond to a view that includes several bindings (e.g., several policies and several policies that are associated with one or more lists). One of these bindings may specify a list of IP addresses that are bound to a particular policy that includes an action of "answer IP1." That is, the action specifies that if the DNS response is IP1, a selector associated with the action may specify that an alternate IP address be returned to the DNS client 125 rather than IP1.

In practice, each DNS query that is generated by DNS clients 125 that utilize the view will be compared to the list of IP address that is bound in the view. If the DNS server 105 determines that the DNS query corresponds to one of the nodes in the list, the DNS server 105 then looks to the policy associated with the list and returns the alternate IP address.

Therefore, after receiving the DNS query, the DNS server 105 may determine a view associated with the DNS client 125 that is to be assigned to the DNS query. The DNS server 105 may determine the view that is associated with the DNS client 125 by locating identifying information that corresponds to the DNS client 125 such as an Internet protocol (IP) address, a media access control (MAC) address, computing system configuration, network identification, and combinations thereof.

In other embodiments, the DNS server 105 may be adapted to determine query attributes associated with the DNS query. Non-limiting examples of DNS query attributes may include any of a name, a time of day at which the DNS query was received, a DNS query type, an initial generation of the DNS response, DNS flags corresponding to the DNS query, one or more extensions associated with the DNS query, previously generated DNS responses, or combinations thereof. The DNS server 105 may select a view for the DNS query by way of a view selector, such as the view selector described with reference element 310 of FIG. 3.

Once the view has been determined or "selected," the DNS server 105 may compare the DNS query to the bindings associated with the view to determine if one or more policies are to be applied to the DNS query. For example, the DNS server 105 may quickly and efficiently compare the DNS query to one or more lists associated with the bindings of the view.

It will be understood that the application of at least one policy to a DNS query before a resolution of the DNS query by the DNS resolver 110 may be referred to as a "pre-resolution" policy hook. If the DNS server 105 does not require the application of a pre-resolution policy hook, the DNS resolver 110 may generate a DNS response to the DNS query by locating previously generated DNS responses stored in a shared DNS cache 130 associated with one or more DNS resolvers 110.

It is noteworthy to mention that multiple views may be associated with a single DNS resolver 110 that utilizes a shared DNS cache 130. As such, the system 100 may allow for greater scalability relative to common DNS systems that typically utilize only an internal view and an external view.

If the DNS resolver 110 is unable to locate a DNS response that corresponds to the DNS query from the shared DNS cache 130, the DNS resolver 110 may be adapted to query one or more authoritative name servers 115 to generate a DNS response.

Regardless of how the DNS response is generated by the DNS resolver 110, the DNS response may be provide back to the DNS server 105 to apply a "post-resolution" hook to the DNS response. The post-resolution hook may substantively correspond to the pre-resolution hook but the post-resolution hook serves a different function. That is, the pre-resolution hook is applied to the DNS query and the post-resolution hook may be applied to the DNS response generated by the DNS resolver 110. Therefore, the system 100 may be adapted to provide a double-layered analysis for each corresponding DNS query and DNS response pair. In some embodiments, either a pre-resolution or a post-resolution hook is utilized.

By way of non-limiting example, the DNS server 105 may utilize a post-resolution hook to prevent unauthorized DNS responses from being provided to the DNS client 125. In practice, if the view that is applied to the DNS query includes a blacklist of IP address, any DNS response that is generated by the DNS resolver 110 may be compared to the blacklist. If the DNS response does, in fact, correspond to an IP address on the blacklist, an action may include resolving an alternative IP address rather than simply blocking the IP address. Because the blacklist includes only IP addresses, the pre-resolution policy hook will only prevent unauthorized DNS responses.

According to some embodiments, shared DNS responses obtained from the shared DNS cache 130 may require additional processing based upon the view assigned to a current DNS query. That is, before a DNS response obtained from the shared DNS cache may be provided to the DNS client 125, the DNS server 105 may determine if one or more post-resolution policy hooks should be applied to the previously generated DNS response.

Stated otherwise, because the current DNS query may not be assigned the same view as the DNS query that prompted the generation of the previously generated DNS response, the previously generated DNS response may require the application of one or more post-resolution policy hooks before the DNS response may be provided to the DNS client 125.

To determine if the previously generated DNS response requires the application of one or more post-resolution policy hooks, the DNS server 105 may compare the view that was utilized to generate the previously generated DNS response to the view assigned to the current DNS query. That is, the bindings of each of the two views are compared to one another for differences.

If the DNS server 105 determines that additional or different policies should be applied to the previously generated DNS response, the DNS server 105 may apply those post-resolution policies to the previously generated DNS response.

With regard to the utilization of previously generated DNS responses, the attributes of a previously generated DNS response may be utilized to determine the validity of the attributes for the current DNS query. As stated previously, each DNS query may include attributes that are utilized by the DNS server 105 to determine the view that should be assigned to the DNS query.

In other embodiments, the DNS server 105 may be adapted to utilize auxiliary information (e.g. computed delegation information) associated with the previously generated DNS response to resolve the current DNS query.

Moreover, to protect DNS clients 125, the DNS resolver 110 may be adapted to detect security threats associated with shared DNS responses stored in the shared cache shared DNS cache 130. Security threat detection methods include, but are not limited to, performing validation of the DNS response by examining the query identifier, ignoring caching recommendations in the response, using UDP Source Port Randomization to identify queries that may be coming from malicious hosts, and using a delegation cache to limit the scope of cached entries. The DNS server 105 may also be adapted to determine DNS specific threats within the shared DNS cache 130 such as DNS cache poisoning and denial of service attacks.

Figure 2:
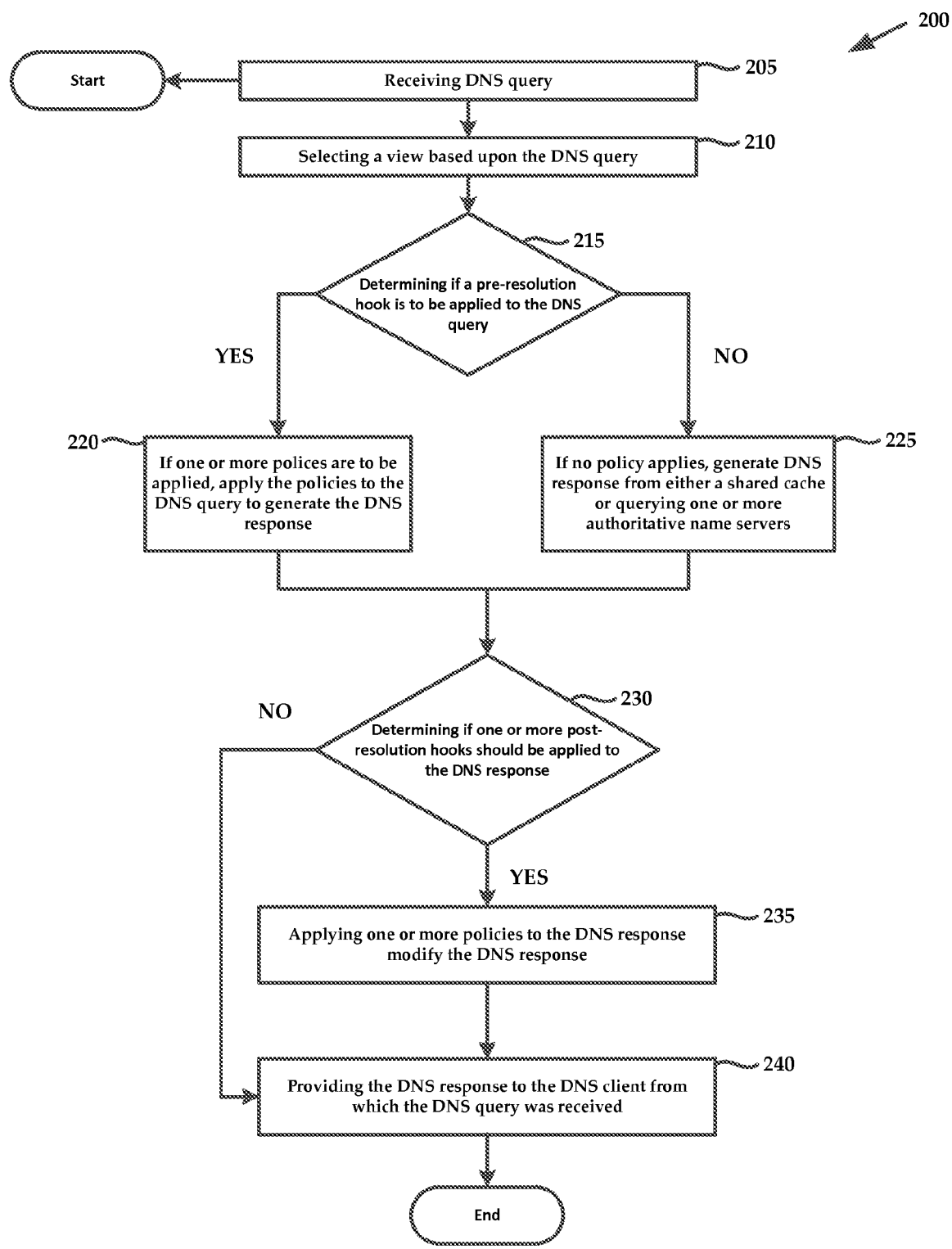
FIG. 2 illustrates an exemplary flow chart of a method for resolving domain name system (DNS) queries.

FIG. 2 illustrates an exemplary flow diagram of a method 200 for resolving DNS queries. The method 200 may include a first step 205 of receiving a DNS query from a DNS client. After receiving the DNS query, the method 200 may include the step of selecting a view that is associated with the DNS query. This may be accomplished by evaluating query attributes or device information associated with the query. It will be understood that device information may include any of Internet protocol (IP) address, a media access control (MAC) address, computing system configuration, network identification, and combinations thereof.

Once the view has been selected, the method 200 includes the step 210 of determining if a pre-resolution policy hook is to be applied to the DNS query. If one or more policies are associated with the view, the method 200 may include the step 215 of applying the one or more policies (e.g., pre-resolution policy hook) to the DNS query. If there are multiple policies that are associated with the view, the policies may be applied to the view according to rank or priority.

If there are no policies that are to be applied to the DNS query, the method 200 may include the step 220 of locating a previously generated DNS response from a shared DNS cache, the DNS response corresponding to the DNS query. If no previously generated DNS responses are found in the shared cache, the step 225 may include querying one or more authoritative name servers to generate a DNS response that corresponds to the DNS query.

Figure 2A:
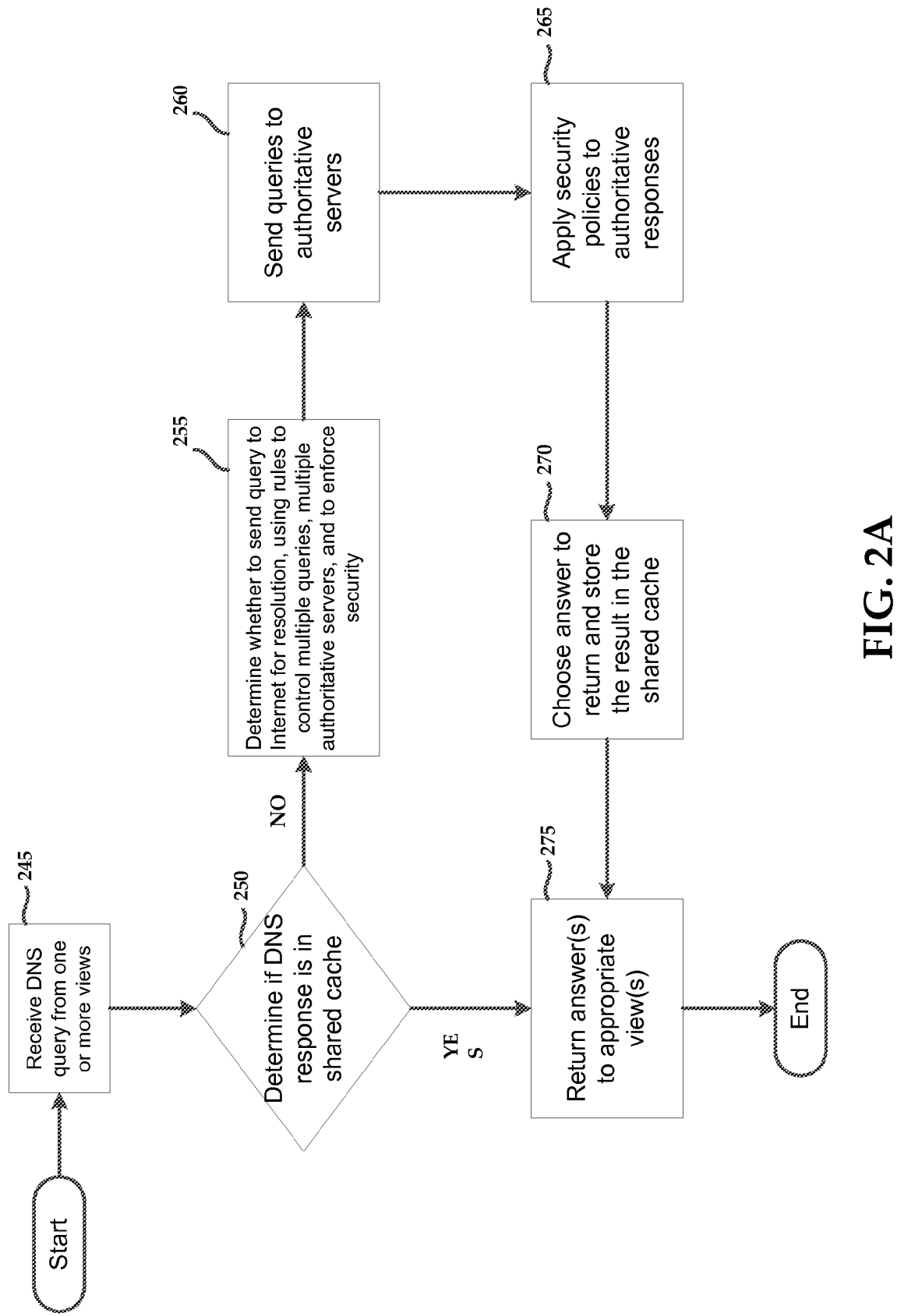
FIG. 2A is a detail flow chart of step 225 in FIG. 2.

FIG. 2A is a detailed flow chart of the process that occurs in step 225. The system receives a DNS query from one or more views in a step 245. In step 250, the shared cache is checked to determine if the DNS response is stored. If the appropriate response to the DNS query is already in the shared cache, the answer is simply returned to the appropriate view in step 275. If not, then in step 255 the queries are examined to determine whether they should be sent to the Internet for resolution using rules that control multiple queries, multiple authoritative servers, and enforce security. In a step 260, the queries are sent to an authoritative server. Answers returned from the authoritative servers as subjected to the applicable security policies in step 265. The appropriate answer is then selected and stored in the shared cache in step 270. Finally, the answer is returned to the appropriate view in step 275.

Regardless of whether the DNS response is generated from previously generated DNS responses stored in the shared cache, or is generated from a query of one or more authoritative name servers, the method 200 may include the step 230 of determining if a post-resolution policy hook (e.g., one or more policies) should be applied to the DNS response by comparing the DNS response to the view. If a post-resolution policy hook is applied to the DNS response, the method 200 may include the step 235 of applying one or more policies to the DNS response to modify the DNS response.

It will be understood that if a post-resolution policy hook is applied to the DNS response, the DNS response that is provided to the DNS client in step 240 may correspond to the one or more policies associated with the post-resolution policy hook. That is, the DNS response that is ultimately provided to the DNS client by the DNS name server may be modified relative to the DNS response generated by the DNS resolver. It will also be understood that whether or not post-resolution policy hooks are applied to the DNS response, the DNS response may be stored in the shared cache.

Figure 3:
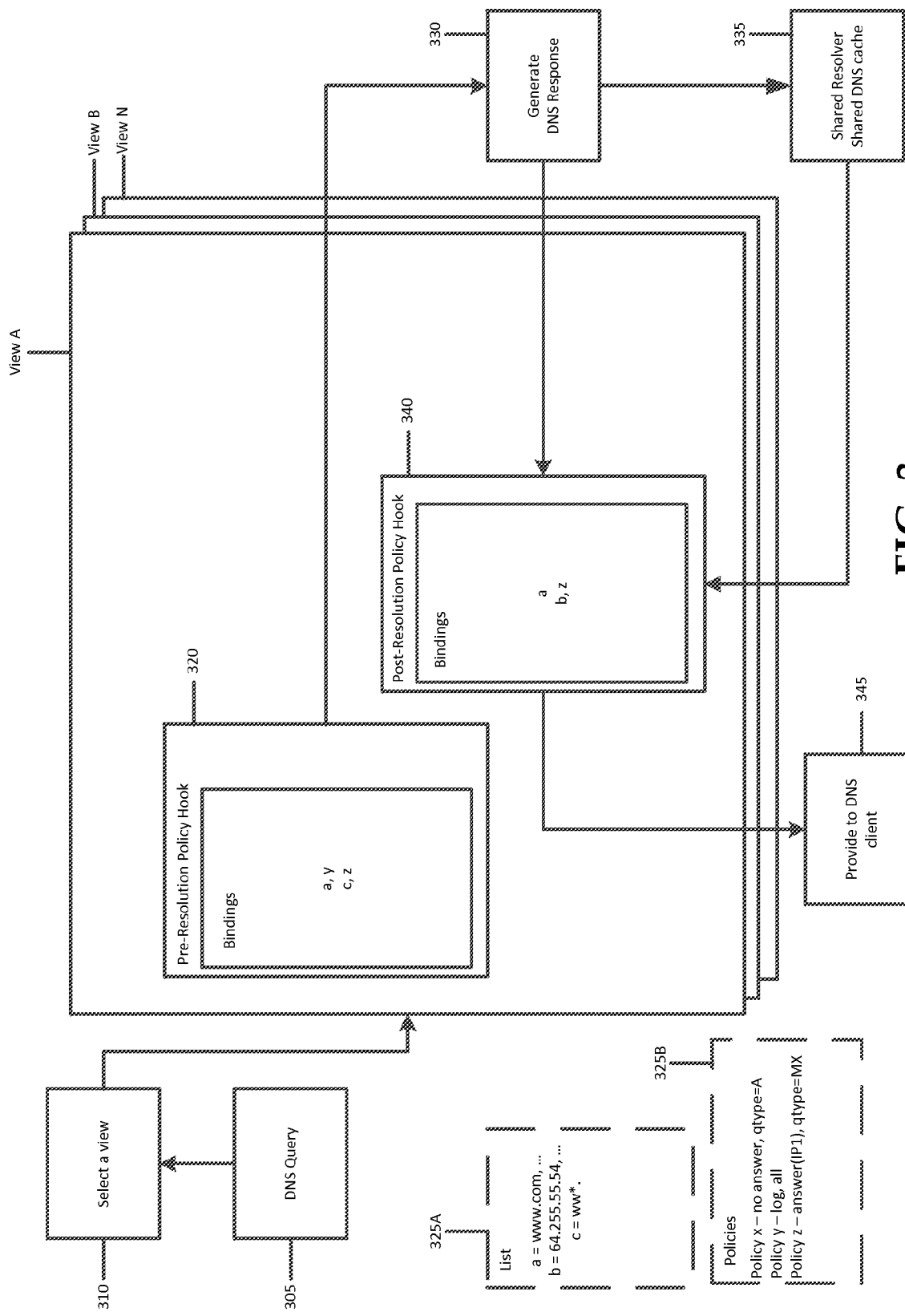
FIG. 3 illustrates a diagrammatical representation of a process for resolving DNS queries.

FIG. 3 illustrates a diagrammatical representation of the process 300 of resolving DNS queries. The process begins with a step 305 of a DNS query being generated by a DNS client. Responsive to receiving the DNS query, step 310 includes a view selector selecting one of a plurality of Views A-N that are to be assigned to the DNS query. Methods for selecting a view for a DNS query are described in greater detail supra. It is noteworthy that the view selector may be a component of the DNS server that receives the DNS query from the DNS client.

Once the view has been selected, pre-resolution policy hooks are applied to the DNS query in step 320. The step 320 of applying pre-resolution policy hooks is shown as including the application of certain bindings. That is, the bindings of the pre-resolution policy hooks of View A are selected from list 325A and policies 325B. More specifically, the bindings include (a, y) and (c, z), selected from list 325A and policies 325B. It will be understood that these lists are constructs that reside in a database associated with the DNS server and are shown with dotted lines for illustrative purposes only.

After the application of the pre-resolution policy hooks of View A, the process includes determining if DNS resolution should occur. It will be understood that if any of the policies associated with View A preclude the generation of a DNS response based upon an evaluation of the DNS query (e.g., query type selection, actions, etc.), the process may terminate before reaching step 330 of generating or locating a DNS response.

If permitted, the process includes the step 335 of generating a DNS response that corresponds to the DNS query, in light of the bindings that have been applied to the DNS query based upon the view.

In some applications, the process includes the step 335 of locating a previously generated DNS response stored in a shared DNS cache. If a shared DNS response cannot be located, the process may return back to step 330 where a DNS response may be obtained from querying one or more authoritative name servers.

Regardless of how the DNS response was obtained, the process may include a step 340 of applying post-resolution policy hooks to the DNS response, based upon View A. For example, the bindings of the post-resolution policy hooks of View A may include applying (a) and the combination of (b, z). The DNS response is then provided in step 345 to the DNS client from, which the DNS query was obtained.

Finally the method 200 may include the step 235 of providing a DNS response to the DNS client from which the DNS query was received.

Figure 4:
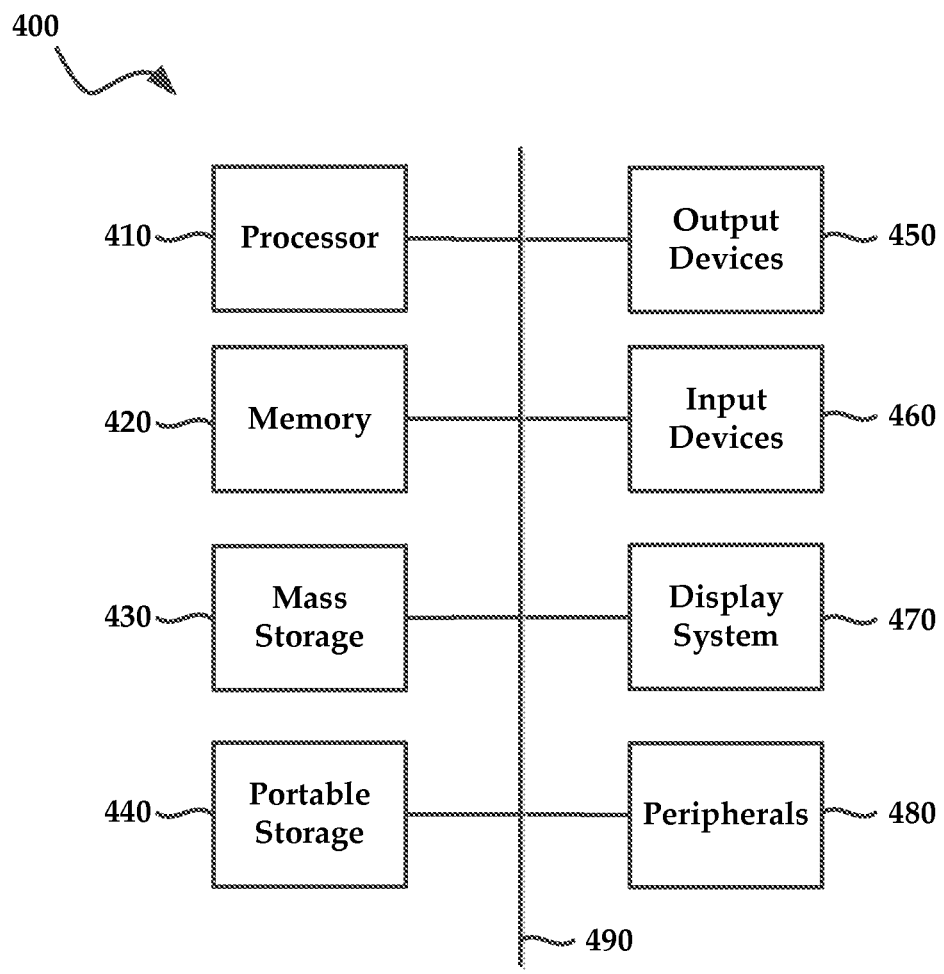
FIG. 4 is a block diagram of an exemplary computing system that may be utilized to practice aspects of the present disclosure.

FIG. 4 illustrates an exemplary computing system 400 that may be used to implement an embodiment of the present invention. System 400 of FIG. 4 may be implemented in the context of DNS client 125, DNS server 105, and the like. The computing system 400 of FIG. 4 includes one or more processors 410 and memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 470, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. Peripheral device(s) 480 may include a modem or a router.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiment, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. For instance, although this description describes the technology in the context of a DNS server, it will be appreciated by those skilled in the art that an Internet service provider may be utilized with this invention instead or in conjunction with a DNS server. Functionalities and method steps that are performed by a DNS server may be performed by an Internet service provider. Furthermore, one skilled in the art will appreciate that the term "Internet content" comprises one or more web sites, domains, web pages, web addresses, one or more hyperlinks, URLs, any text, pictures, and/or media (such as video, audio, and any combination of audio and video) provided or displayed on a web page, and any combination thereof.

What is claimed is:

1. A method for resolving domain name system (DNS) queries, the method comprising:
receiving a DNS query from a DNS client via a DNS server, the DNS query being assigned to a view to be utilized by the DNS server to generate a DNS response, the view being associated with one or more policies, the view including at least one policy;
responsive to the DNS query, generating the DNS response utilizing the at least one policy associated with the view;
providing the DNS response to the DNS client from which the DNS query was received; and
storing the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

2. The method according to claim 1, further comprising binding at least one policy to at least one view, the at least one policy including one or more lists that each comprise one or more nodes, each of the one or more lists including at least one action, wherein if the DNS query corresponds to a node included in a list, the at least one action associated with the list is utilized to affect the DNS response generated by the DNS server.

3. The method according to claim 2, wherein a view includes two or more policies and each policy includes a priority for ranking policies in an order of execution relative to one another such that when the view is utilized the two or more policies are utilized according to the order of execution.

4. The method according to claim 2, wherein the at least one action includes any of logging, blocking, filtering, modifying, editing, constraining, enabling, redirecting, promoting, demoting, substituting, obscuring, limiting, interrupting, restricting, or combinations thereof.

5. The method according to claim 1, further comprising associating one or more DNS clients with the view.

6. The method according to claim 1, wherein the DNS query includes an extension that includes at least one of end user identification information and device information indicative of the DNS client from which the DNS query was received, the extension used by the DNS server to select a view for the DNS query.

7. The method according to claim 6, wherein the device information includes information indicative of a media access control address, computing system configuration information, network identification, or combinations thereof.

8. The method according to claim 1, wherein the policies include information indicative of a customized DNS response generated by the DNS server.

9. The method according to claim 1, further comprising applying the at least one policy to the DNS query before the DNS response is generated by the DNS server.

10. The method according to claim 1, further comprising performing the DNS response of a query and receiving an answer in the context of a view.

11. The method according to claim 1, further comprising applying the at least one policy to the DNS query after the DNS response is generated by the DNS server but before the DNS response is provided to the DNS client.

12. The method according to claim 1, further comprising prioritizing the one or more policies that apply to the DNS query within the view.

13. The method according to claim 1, further comprising:
preventing providing the DNS response if the DNS response is determined to be excluded by the one or more policies;
determining whether the view that is to be utilized by the DNS server includes at least one action that is to be applied to the DNS response; and
applying the at least one action to subsequent DNS queries received from the DNS client.

14. The method according to claim 13, further comprising generating one or more additional policies that are to be associated with the view that is utilized by the DNS server for future DNS queries that match the view.

15. The method according to claim 1, further comprising providing a previously generated DNS response stored in a shared DNS cache, wherein at least a portion of the DNS queries used to generate the previously generated DNS responses stored in the shared DNS cache are associated with views having different personalized sets of policies relative to one another.

16. The method according to claim 1, further comprising distributing the shared DNS response across two or more DNS servers.

17. The method according to claim 1, further comprising selecting one or more of the policies that are applied to the DNS query by evaluating query attributes obtained from the DNS query.

18. The method according to claim 17 wherein the query attributes include any of a name, a time of day at which the DNS query was received, a DNS query type, an initial generation of the DNS response, DNS flags corresponding to the DNS query, one or more extensions associated with the DNS query, previously generated DNS responses, or combinations thereof.

19. The method according to claim 1, wherein the DNS server processes a DNS name and stores the DNS response in one or more shared DNS caches.

20. The method according to claim 1, wherein the shared cache is associated with one or more views, wherein the one or more views are different from one another in at least one way.

21. The method according to claim 20, wherein the DNS shared cache is adapted to be flushed, modified, reused, and reassigned while maintaining associations between the one or more views and the shared cache without requiring manipulation or reference to each view which references that shared cache.

22. The method according to claim 20, further comprising selecting a DNS response from the shared cache for a current DNS query, the DNS response having been formulated while processing a DNS query that was resolved in the context of a different view.

23. The method according to claim 22, further comprising applying one or more policies to the DNS response selected from the shared cache, the one or more policies being bound to the view associated with the current DNS query.

24. The method according to claim 22, wherein an attribute of a DNS response which is stored in a shared cache is utilized to determine a validity of the attribute for the current DNS query.

25. The method according to claim 24, wherein the attribute includes any of a name, a time of day at which the DNS query was received, a DNS query type, an initial generation of the DNS response, DNS flags corresponding to the DNS query, one or more extensions associated with the DNS query, previously generated DNS responses, or combinations thereof.

26. The method according to claim 22, wherein auxiliary information of the selected DNS response which is stored in the shared cache is utilized to resolve the current DNS query.

27. The method according to claim 22, further comprising:
   detecting security threats associated with DNS responses stored in the shared cache; and
   removing DNS responses determined to include a security threat.

28. The method according to claim 27, wherein detecting includes determining the presence of at least one of DNS cache poisoning and a denial of service attack.

29. A domain name system (DNS) server system adapted to resolve DNS queries, the system comprising:
   at least one DNS server computer adapted to receive a DNS query from a DNS client, the DNS query being assigned to a view, the view being associated with one or more policies, the view including at least one policy, the at least one DNS server including at least one DNS resolver adapted to:
      generate a DNS response utilizing the view by applying the at least one policy to the DNS query, the at least one DNS resolver being communicatively coupled to the at least one DNS name server;
      provide the DNS response to the DNS client from which the DNS query was received; and
      store the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

30. The DNS server system according to claim 29, wherein the at least one DNS server is adapted to bind at least one policy to at least one view, the at least one policy including one or more lists that each comprise one or more nodes, each of the one or more lists including at least one action, wherein if the DNS query corresponds to a node included in a list, the at least one action associated with the list is applied to the DNS query to affect the way in which the DNS resolver generates the DNS response.

31. The DNS server system according to claim 30, wherein a view includes two or more policies and each policy includes a priority for ranking policies in an order of execution relative to one another such that when the view is utilized the two or more policies are utilized according to the order of execution.

32. The DNS server system according to claim 31, wherein the DNS server is adapted to associate one or more DNS clients with the view.

33. The DNS server system according to claim 29, wherein the DNS query includes an extension that includes at least one of end user identification information and device information indicative of the DNS client from which the DNS query was received.

34. The DNS server system according to claim 33, wherein the device information includes information indicative of a media access control address, computing system configuration information, network identification, or combinations thereof.

35. The DNS server system according to claim 29, wherein the policies include information indicative of a customized DNS response generated by the DNS resolver.

36. The DNS server system according to claim 29, wherein the DNS server is adapted to apply the at least one policy to the DNS query before the DNS response is generated by the DNS resolver.

37. The DNS server system according to claim 29, wherein the DNS resolver is adapted to perform the DNS response of a DNS query, in the context of the view.

38. The DNS server system according to claim 29, wherein the DNS server is adapted to apply the at least one policy to the DNS query after the DNS response is generated by the DNS resolver but before the DNS response is provided to the DNS client.

39. The DNS server system according to claim 29, wherein the at least one action includes any of logging, blocking, filtering, modifying, editing, constraining, enabling, redirecting, promoting, demoting, substituting, obscuring, limiting, interrupting, restricting, or combinations thereof.

40. The DNS server system according to claim 29, wherein the DNS server is adapted to prioritize the one or more policies that are applied to the DNS query within the view.

41. The DNS server system according to claim 29, wherein the DNS server is adapted to:
   prevent providing the DNS response if the DNS response is determined to be excluded by the one or more policies;
   determine whether the view that is to be utilized by the DNS resolver includes at least one action that is to be applied to the DNS response; and
   apply the at least one action to the DNS query and any subsequent DNS queries received from the DNS client that correspond to the DNS query.

42. The DNS server system according to claim 29, wherein the DNS server is adapted to generate one or more additional policies that are to be associated with the view, the view being utilized by the DNS resolver for future queries that match this view.

43. The DNS server system according to claim 29, wherein the DNS server is adapted to utilize a previously generated DNS response stored in a shared DNS cache, wherein at least a portion of the DNS queries used to generate the previously generated DNS responses stored in the shared DNS cache are associated with views having different personalized sets of policies relative to one another.

44. The DNS server system according to claim 29, wherein the DNS resolver is adapted to distribute the shared DNS response across two or more DNS resolvers.

45. The DNS server system according to claim 29, wherein the DNS server is adapted to select one or more of the policies that are applied to the DNS query by evaluating query attributes obtained from the DNS query.

46. The DNS server system according to claim 29, wherein query attributes include any of a name, a time of day at which the DNS query was received, a DNS query type, an initial generation of the DNS response, DNS flags corresponding to the DNS query, one or more extensions associated with the DNS query, previously generated DNS responses, or combinations thereof.

47. The DNS server system according to claim 29, wherein the DNS resolver processes a DNS name and stores the answer in one or more shared caches.

48. The DNS server system according to claim 29, wherein the shared cache is associated with one or more views.

49. The DNS server system according to claim 29, wherein the DNS resolver is adapted to at least one of flush, modify, reuse, and reassign the shared cache while maintaining associations between the one or more views and the shared cache without requiring manipulation or reference to each view which references that shared cache.

50. A non-transitory computer readable storage medium having a computer program embodied thereon, the computer program executable by a processor in a computing system to perform a method for resolving domain name system (DNS) queries, the method comprising:
    receiving a DNS query from a DNS client via a DNS server, the DNS query being assigned to a view to be utilized by the DNS server to generate a DNS response, the view being associated with one or more policies, the view including at least one policy;
    responsive to the DNS query, generating the DNS response utilizing the at least one policy associated with the view;
    providing the DNS response to the DNS client from which the DNS query was received; and
storing the DNS response in a shared cache, the shared cache including previously generated DNS responses that are available to the DNS server, wherein previously generated DNS responses may be provided to DNS clients upon receiving a DNS query corresponding to at least one of the previously generated DNS responses.

\* \* \* \* \*